United States Patent
Wittenbrink (12) 
(10) Patent No.: US 6,570,575 B1
(45) Date of Patent: May 27, 2003

(54) ASSOCIATED COLOR TEXTURE PROCESSOR FOR HIGH FIDELITY 3-D GRAPHICS RENDERING

(75) Inventor: Craig M. Wittenbrink, Redwood City, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 436 days.

(21) Appl. No.: 09/642,040

(22) Filed: Aug. 18, 2000

(51) Int. Cl.⁷ .................................................. G09G 5/02
(52) U.S. Cl. ........................ 345/592; 345/424; 345/582
(58) Field of Search ................. 345/424, 582, 345/589, 606, 607

(56) References Cited

U.S. PATENT DOCUMENTS 5,339,386 A * 8/1994 Sodenberg et al. ......... 345/592
6,278,459 B1 * 8/2001 Malzbender et al. ........ 345/424
6,424,346 B1 * 7/2002 Correll et al. ............... 345/592

* cited by examiner

*Primary Examiner*—Matthew Luu (57) ABSTRACT

Texture mapping computer graphics apparatus includes an associating interpolator circuit for determining first interpolated opacity weighted colors and a first interpolated opacity in response to texture coordinates and texture colors and corresponding texture opacities, an associated color compositing circuit for a compositing the first interpolated opacity weighted colors and second interpolated opacity weighted colors to provide new opacity weighted colors, an associated opacity compositing circuit for compositing the first interpolated opacity and a second interpolated opacity to provide a new opacity, an unassociating circuit responsive to the new opacity weighted colors and the new opacity for providing unassociated colors, and a frame buffer for storing the unassociated new colors and the new opacity.

21 Claims, 7 Drawing Sheets

ASSOCIATED COLOR TEXTURE PROCESSOR FOR HIGH FIDELITY 3-D GRAPHICS RENDERING

FIELD OF THE INVENTION

This invention relates to texture mapping computer graphics systems and, more particularly, to methods and apparatus for color texture processing which provide high fidelity 3-D graphics rendering.

BACKGROUND OF THE INVENTION

Many imaging systems produce data representing physical entities or properties in three-dimensional space. Examples include CAT scans, MRI scans, ultrasound images and seismic test images. The process of converting the three-dimensional arrays of data into two-dimensional image displays is referred to as volume rendering. The term "voxel processing" is also used, because the 3-D space is ordinarily broken down into small volumes, referred to as voxels. Each voxel has optical properties, ordinarily expressed in terms of opacity (or its complement, transparency) and color (or gray scale in black and white imaging systems). These properties contribute to the overall image when it is to be computed by mathematical projection and sampling and converted into pixels to be displayed on a two-dimensional display surface.

The computation-intensive nature of graphics has driven research in algorithm optimization. An important technique for speed optimization is the use of opacity compositing and multipass rendering to combine independently rendered layers. However, artifacts result when interpolating from textures or images and opacity values separately. A technique which avoids the artifacts in volume rendering is described by C. Wittenbrink et al. in "Opacity-Weighted Color Interpolation for Volume Sampling," IEEE, 1998 Symposium on Volume Visualization, Oct. 19–20, 1998. According to this technique, voxel colors are opacity weighted before interpolation. The authors suggest that the disclosed technique may provide a fix for artifacts which exist in texture mapping graphic systems that use color and opacity textures.

Artifacts that exist in prior art texture mapping graphics systems include color bleeding, aliasing, jagged edges and others. Prior solutions to these artifacts include (1) allow the artifacts, (2) preweight the colors by opacity in the storage of object data, and (3) interpolate materials and not the colors, so that the interpolated material values may be classified to colors and opacities.

A disadvantage of the first approach is that many artifacts are created. Existing graphics hardware uses interpolation of unassociated colors and therefore exhibits the artifacts.

A disadvantage of the second approach is that the precision of representation is reduced, or the amount of storage required is increased. For example, because opacity is a fractional value, from 0 to 1, the weighted color values are scaled down. The scaled down color values cannot as accurately be represented within a fixed bit format, which is used to store the data for graphics rendering. Fixed bit formats are, for example, 8 bits to represent each color component, red, green and blue, for a total of 24 bits.

When opacity weighting is performed, small opacity values force colors to become zero. An alternative way to compensate for this reduction in precision is to increase the word width. The color word widths would have to be enlarged to more bits, for example, 20 bits per color component for red, green and blue for 60 bits total. Existing hardware can have data preweighted, or associated, by multiplication, but the texture and frame buffer storage are fixed point at a reduced precision. This causes artifacts from the low precision. Current graphics APIs, such as Microsoft Direct 3D, propose and use preweighted colors, and because of using the frame buffer storage and texture storage as a fixed point, suffer the errors due to the reduced precision.

A disadvantage of the third approach is that it requires classification from material to color and opacity after interpolation, which means more calculation for rendering, and many data inputs are already colors and opacities, so a material value is not available. This solution has been more prevalent in software systems for volumetric rendering. The post-classification of interpolated material values has an additional disadvantage, wherein the changing viewpoint in rendering, combined with approximate reconstruction filters, means that each view constructs a different material sampling. This creates frame-to-frame aliasing which may not be acceptable to users. The fact that many data sets are already colors, and not materials, means that this solution cannot handle these cases, and something must be done to properly interpolate when the inputs are colors and opacities. Nearly all prior art graphics hardware manipulates color data rather than material values in the fragment and texture interpolation stages.

It is therefore desirable to provide methods and apparatus for color texture processing in computer graphics systems wherein some or all of the foregoing drawbacks are overcome.

SUMMARY OF THE INVENTION

According to a first aspect of the invention, texture mapping computer graphics apparatus is provided. The apparatus comprises an associating interpolator circuit for determining first interpolated opacity weighted colors and a first interpolated opacity in response to texture coordinates and a plurality of texture colors and corresponding texture opacities, an associated color compositing circuit for compositing the first interpolated opacity weighted colors and second interpolated opacity weighted colors to provide new opacity weighted colors, an associated opacity compositing circuit for compositing the first interpolated opacity and a second interpolated opacity to provide a new opacity, an unassociating circuit responsive to the new opacity weighted colors and the new opacity for providing unassociated colors, and a frame buffer for storing the unassociated new colors and the new opacity.

The associating interpolator circuit may comprise a weight calculation circuit responsive to the texture coordinates for determining weights corresponding to each of the texture colors, and a plurality of multipliers for multiplying the texture opacities by corresponding ones of the weights to provide weighted opacities. The associating interpolator circuit may further comprise an opacity summing circuit for summing the weighted opacities to provide the first interpolated opacity. The associating interpolator circuit may further comprise, for each color component, a plurality of multipliers for multiplying the texture colors by corresponding ones of the weighted opacities to provide opacity weighted texture colors, and a color summing circuit for summing the opacity weighted texture colors to provide one of the first interpolated opacity weighted colors.

The associated color compositing circuit may comprise, for each color component, a color register for holding one of the second interpolated opacity weighted colors, first and second multiplexers for selecting interpolated opacity weighted colors from the associating interpolator circuit and the color register, and a compositor responsive to the selected interpolated opacity weighted colors and the interpolated opacity for determining the new opacity weighted color. Compositing may be performed from front-to-back or from back-to-front.

The associated opacity compositing circuit may comprise an opacity register for holding the second interpolated opacity, first and second multiplexers for selecting interpolated opacities from the associating interpolator circuit and the opacity register, and a compositor responsive to the selected interpolated opacities for determining the new opacity.

The unassociating circuit may comprise a circuit for dividing each of the new opacity weighted colors by the interpolated opacity to provide the unassociated new colors.

The new opacity weighted colors may have higher precision than the unassociated new colors. The colors are represented at higher precision in the compositing circuit and are stored at lower precision, thereby permitting a reduction in physical memory and associated buses.

According to another aspect of the invention, a method is provided for performing texture mapping in a computer graphics system. The method comprises the steps of determining first interpolated opacity weighted colors and a first interpolated opacity in response to texture coordinates and a plurality of texture colors and corresponding texture opacities, compositing the first interpolated opacity weighted colors and second interpolated opacity weighted colors to provide new opacity weighted colors, compositing the first interpolated opacity and a second interpolated opacity to provide a new opacity, providing unassociated new colors in response to the new opacity weighted colors and the new opacity, and storing the unassociated new colors and the new opacity in a frame buffer.

BRIEF DESCRIPTION OF THE DRAWINGS

For a better understanding of the present invention, reference is made to the accompanying drawings, which are incorporated herein by reference and in which.

DETAILED DESCRIPTION

Figure 1:
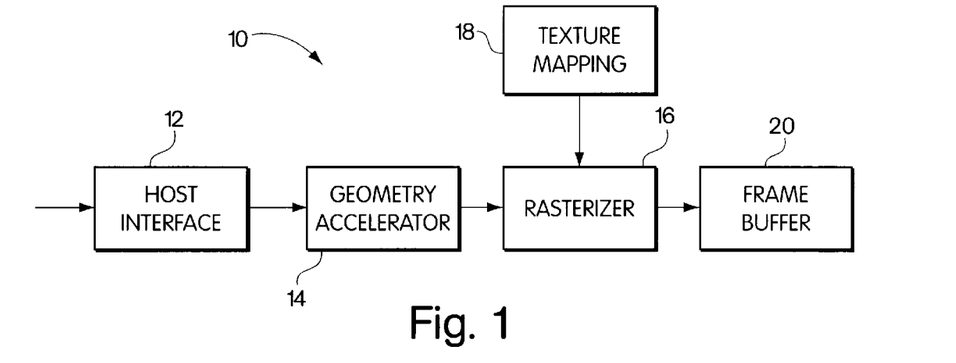
FIG. 1 is a block diagram of an example of a graphics rendering pipeline.

A simplified block diagram of one embodiment of a computer graphics system 10 is shown in FIG. 1. The system 10 as shown includes a host interface 12, a geometry accelerator 14, a rasterizer 16, a texture mapping subsystem 18, and a memory in the form of a frame buffer 20. Other embodiments may include a plurality of geometry accelerators and rasterizers. The system generates pixel data for controlling the pixels of a monitor (not shown).

The host interface 12 communicates with a host computer (not shown) and receives data representing primitives to be rendered from the host computer. The primitives, which may include points, lines, vectors and polygons, are specified by X, Y, Z vector coordinate data, R, G, B color data and S, T, R, Q texture coordinates for portions of the primitives, such as the vertices of a triangle.

The geometry accelerator 14 transforms the X, Y, Z coordinates that define the primitives into corresponding screen space coordinates, determines object R, G, B color values and texture S, T, R, Q values for the screen space coordinates, decomposes primitive quadrilaterals into triangles and computes a triangle plane equation to define each triangle.

The rasterizer 16 interpolates the rendering parameters generated by the geometry accelerator 14 to determine X and Y coordinates and color values for each pixel of each triangle. The rasterizer 16 interpolates the X, Y, Z pixel coordinates and interpolates S, T, R, Q coordinates that correspond to each X, Y screen-display pixel that represents a primitive. In the rasterization process, the edges of triangles are determined, and then the pixels along each edge are determined, for example, by interpolating between the vertex information. Then the pixels along each span line between the edges are determined by interpolation of the edge information. The rasterizer also performs compositing in the Z direction.

For each pixel, the texture mapping subsystem 18 accesses portions of one or more texture MIP maps that correspond to the pixel and computes resultant texture data for the pixel. The resultant texture data may include a weighted average of multiple pixels.

Frame buffer 20 includes a memory controller and may be used for storage of image data. Texture mapping data may be stored in texture mapping subsystem 18 or the frame buffer 20, depending on the system configuration.

Texture mapping is commonly used in computer graphics systems to provide improved surface detail. Texture mapping involves mapping a source image, referred to as a texture, onto a surface of a three-dimensional object, and thereafter mapping the textured three-dimensional object to the two-dimensional display screen. The texture mapping involves applying one or more point elements (texels) of a texture to each point element (pixel) of the displayed portion of the object to which a texture is being mapped. Texture mapping hardware is conventionally provided with information indicating the manner in which the texels in a texture map correspond to the pixels on the display screen that represent the object. Each texel in a texture map is defined by S, T, R, Q coordinates which define its location in the two-dimensional texture map. In the case of a three-dimensional texture map, each texel is defined by S, T and R coordinates. For each pixel, the corresponding texel or texels that map to it are accessed from the texture map and are interpolated into the final R, G, B values generated for the pixel to represent the textured object on the display screen.

Each pixel in an object primitive may not map in a one-to-one correspondence with a single texel in the texture map. Depending on the size of the object on the display screen and the size of the texture map, a single pixel may map to multiple texels, or a single texel may map to multiple pixels. To facilitate texture mapping, a series of MIP maps may be created for each texture. A series of MIP maps includes a base map that corresponds directly to the texture map and a series of filtered maps, wherein each successive map is reduced in size by a factor of two in each of the two texture map dimensions. The series of texture MIP maps associated with the object being rendered is stored in a local memory accessible by the texture mapping hardware.

The texture mapping hardware can access texture data from any of the series of MIP maps. The determination of which map to access to provide the texel data for any particular pixel is based on the number of texels to which the pixel maps. If a pixel maps in a one-to-one correspondence with a single texel in the texture map, then the base map is accessed. However, if the pixel maps to 4, 16 or 64 texels, then different level maps in the series are accessed because those maps store texel data representing an average of 4, 16 and 64 texels in the texture map.

A pixel may not map directly to any one texel in the selected map and may fall between two or more texels in a single map or may fall between two maps. In this case, interpolation is utilized to accurately produce texel data. The texel data corresponding to a pixel can be a weighted average of four texel entries in a single map or a weighted average of eight texels in the two closest maps.

Figure 2:
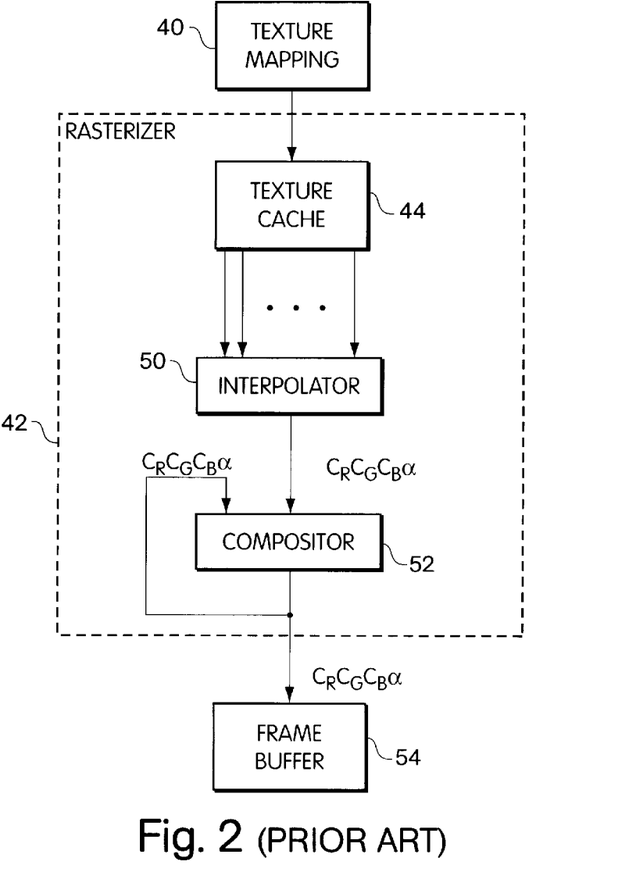
FIG. 2 is a block diagram of texture mapping computer graphics apparatus in accordance with the prior art.

Referring now to FIG. 2, a prior art rasterizer is shown. Texture data from a texture mapping subsystem 40 is supplied to a rasterizer 42. The texture data may be held in a texture cache 44. For three-dimensional texture mapping or two-dimensional MIP mapped operation, data for eight texels is sent to an interpolator 50. The texel data includes red, green and blue color values, and opacity. The interpolator 50 outputs interpolated red, green, blue and opacity values to a compositor 52. The compositor 52 receives interpolated color and opacity values from interpolator 50 and from a frame buffer 54 and determines new color and opacity values to be stored in frame buffer 54.

In the following discussion, R represents a red color value, G represents a green color value, B represent a blue color value and $\alpha$ represents an opacity value. The phrase "associated colors" is used interchangeably herein with the phrase "opacity weighted colors". If the texture colors are preweighted and stored as associated, or opacity weighted, colors R$\alpha$, G$\alpha$ and B$\alpha$, then the fixed point texture storage in frame buffer 54 degrades the stored texture values. For example, assume a texel wherein R=254, G=254, B=254 and $\alpha$=1, where all values are 8-bit fixed point values. The color value R represented as a real number would be R/255, which varies from 0 to 1. Now store these texel values in the prior art system shown in FIG. 2. The value of R$\alpha$ is computed as 254/255*1/255=254/65025. This fraction is less than 1/255, the smallest value that can be stored using 8-bit fixed point representation. Therefore the texel values are stored as R$\alpha$=0, G$\alpha$=0, B$\alpha$=0 and $\alpha$=1, and a very severe error is produced.

Figure 3:
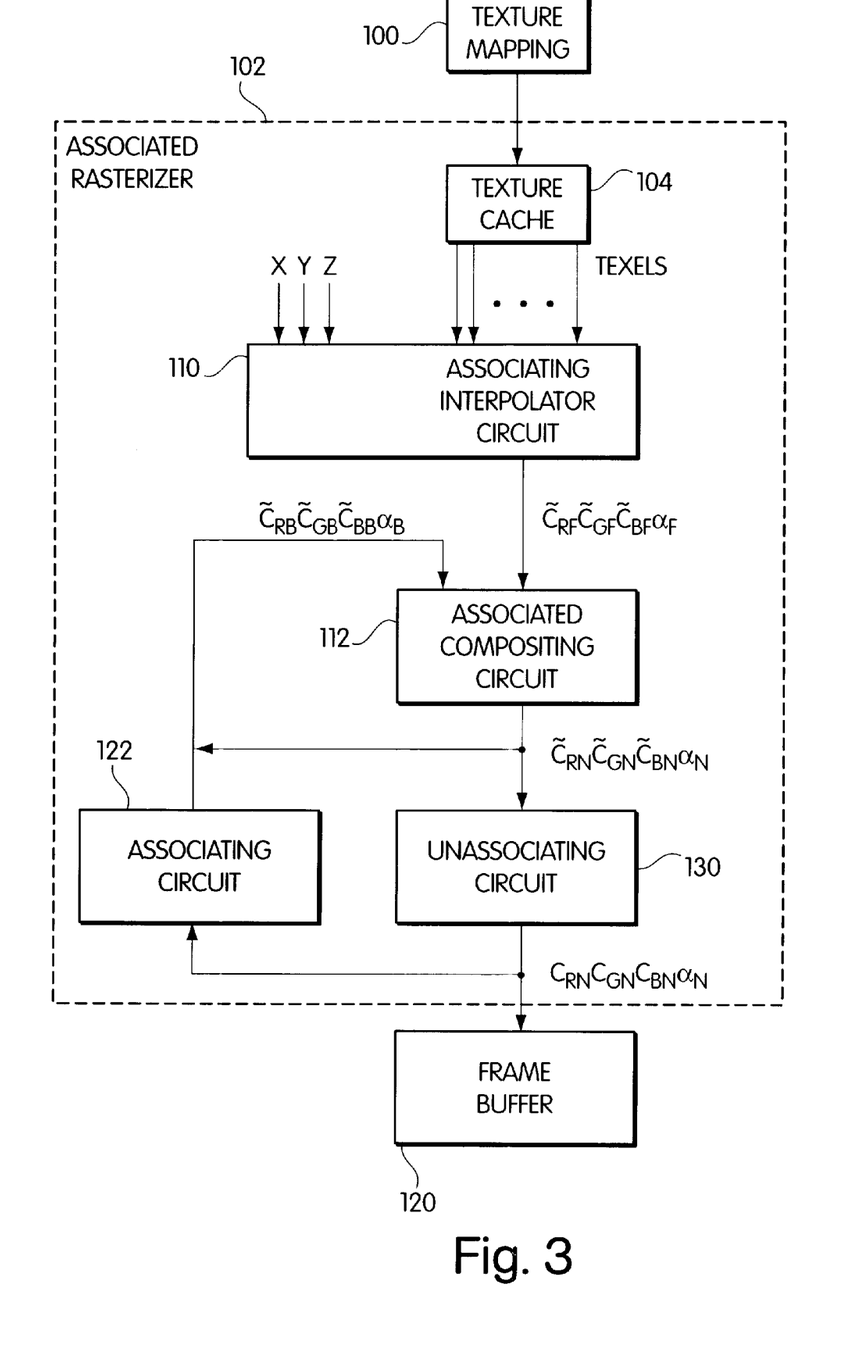
FIG. 3 is a block diagram of texture mapping computer graphics apparatus in accordance with an embodiment of the invention.

A block diagram of texture mapping computer graphics apparatus in accordance with an embodiment of the invention is shown in FIG. 3. A texture mapping subsystem 100 supplies texture data to an associated rasterizer 102. The texture data is stored in a texture cache 104. The texture cache 104 supplies texel data to an associating interpolator circuit 110. The associating interpolator circuit 110 also receives texture coordinates X, Y. Z. The texel data may include texture colors and corresponding texture opacities.

The associating interpolator circuit 110 determines front interpolated, opacity weighted colors $\tilde{C}_{RF}$, $\tilde{C}_{GF}$, $\tilde{C}_{BF}$ and a front interpolated opacity $\alpha_F$, and supplies the interpolated values to an associated compositing circuit 112. The associated compositing circuit 112 receives front and back interpolated, opacity weighted colors and provides new opacity weighted colors at its output. The front interpolated opacity weighted color may be received from associating interpolator circuit 110. The back interpolated, opacity weighted colors $\tilde{C}_{RB}$, $\tilde{C}_{GB}$, $\tilde{C}_{BB}$ may be received from a frame buffer 120 through an associating circuit 122 or may be received from the output of associated compositing circuit 112 as a current value in an iterative process. The associated compositing circuit 112 outputs new opacity weighted colors $\tilde{C}_{RN}$, $\tilde{C}_{GN}$, $\tilde{C}_{BN}$ and a new opacity $\alpha_N$ The new opacity weighted colors and the new opacity are processed by an unassociating circuit 130 to provide unassociated new colors $C_{RN}$, $C_{GN}$, $C_{BN}$. The unassociated new colors and the new opacity are stored in frame buffer 120. It will be understood that compositing can be performed from front-to-back or from back-to-front and that the front and back designations used herein may be reversed.

The associated compositing circuit 112 operates with associated, or opacity weighted, colors. The compositing may be performed at relatively high precision. The new opacity weighted color is then unassociated by unassociating circuit 130 prior to storage in frame buffer 120. The representation of the data following associating interpolator circuit 110 is of high precision and possibly floating point to take benefit of the more accurate compositing. A benefit of the circuit shown in FIG. 3 is that it may be transparently added to a graphics system, since it does not affect the application programming interface or other parts of the graphics pipeline.

Figure 4:
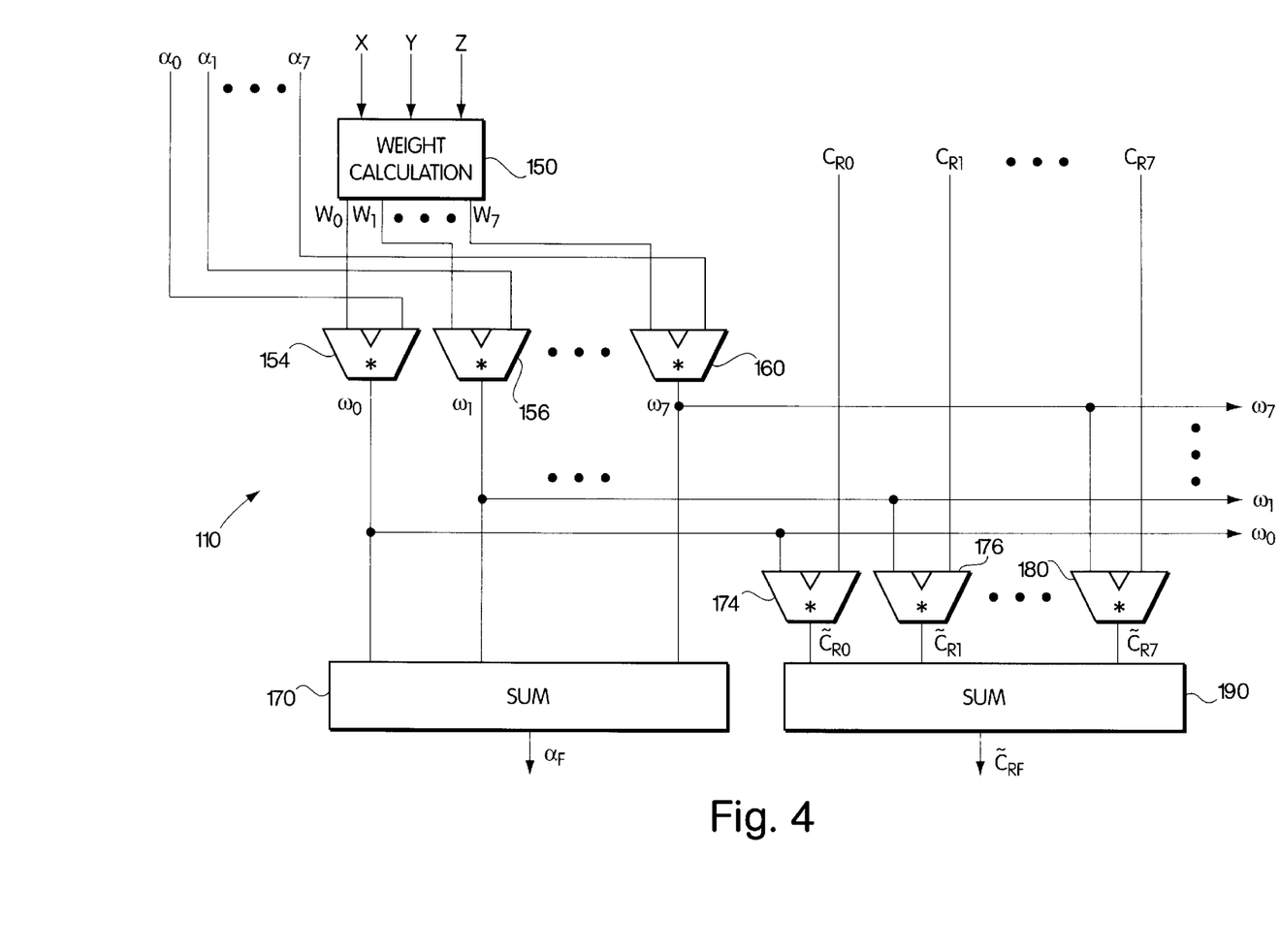
FIGS. 4 and 5 are block diagrams of an embodiment of the associating interpolator circuit of FIG. 3.
Figure 5:
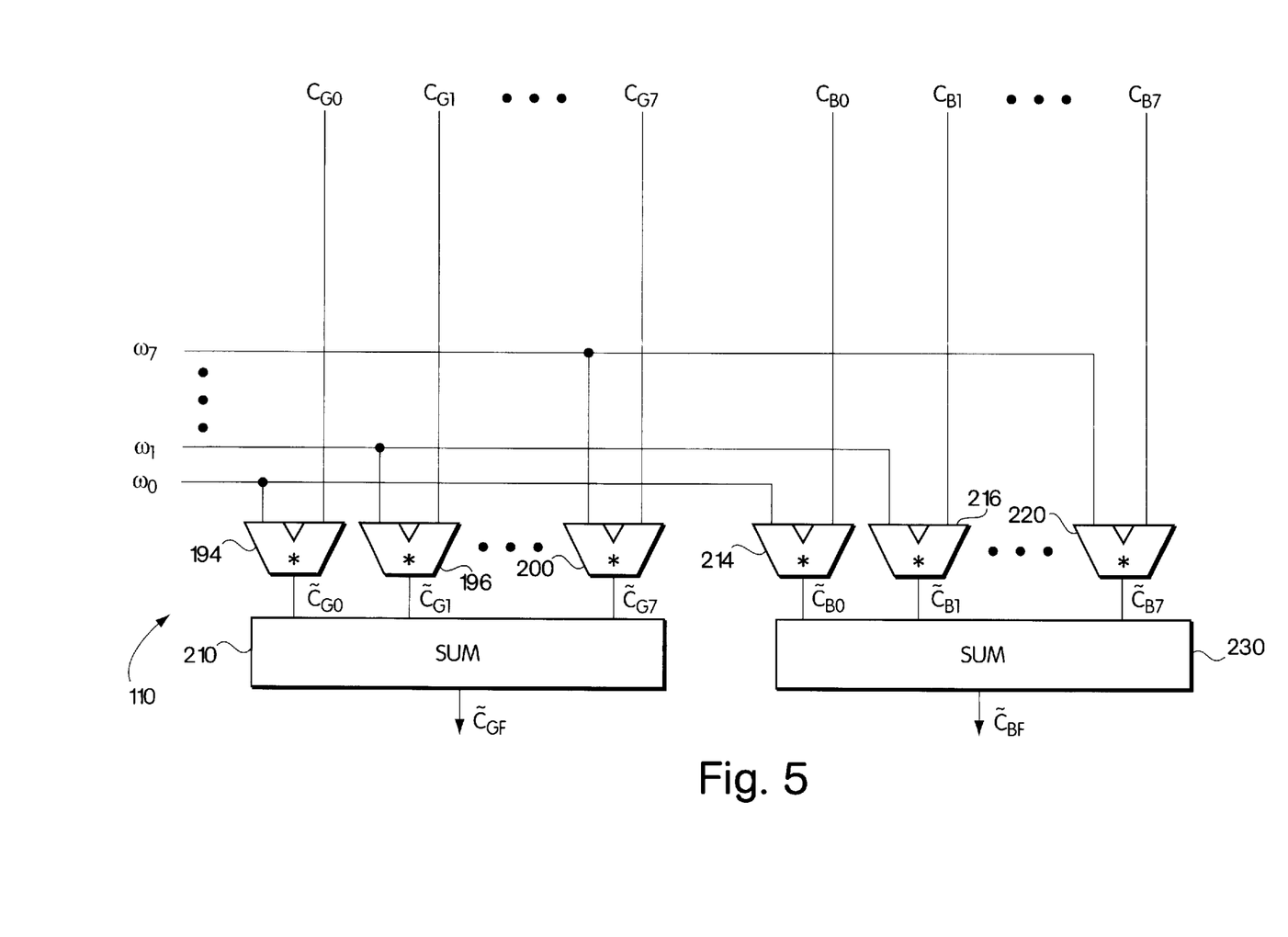

A block diagram of associating interpolator circuit 110 is shown,in FIGS. 4 and 5. As shown in FIG. 4, the X, Y, Z texture coordinates are input to a weight calculation circuit 150. Weight calculation circuit 150 determines eight weights $W_0, W_1, \ldots W_7$, which are the fractional contributions from the eight inputs to the interpolators. By way of example, the weight calculation circuit 150 may implement a trilinear filter as described in the aforementioned paper by C. Wittenbrink et al. The associating interpolator circuit 110 receives eight texels, including red texel values $C_{R0}, C_{R1}, \ldots C_{R7}$, green texel values $C_{G0}, C_{G1}, \ldots C_{G7}$ and blue texel values $C_{B0}, C_{B1}, \ldots C_{B7}$, and corresponding opacities $\alpha_0, \alpha_1, \ldots \alpha_7$. The opacity values $\alpha_0, \alpha_1, \ldots \alpha_7$ are multiplied by the corresponding weights $W_0, W_1, \ldots W_7$ in multipliers 154, 156, . . . 160 to provide weighted opacities $\omega_0, \omega_1, \ldots \omega_7$. The weighted opacities $\omega_0, \omega_1, \ldots \omega_7$ are summed by a summing circuit 170 to provide front interpolated opacity $\alpha_F$.

The weighted opacities $\omega_0, \omega_1, \ldots \omega_7$ are multiplied by respective red texel values $C_{R0}, C_{R1}, \ldots C_{R7}$ in multipliers 174, 176, . . . 180, respectively, to provide opacity weighted red texture colors $\tilde{C}_{R0}, \tilde{C}_{R1}, \ldots \tilde{C}_{R7}$. The opacity weighted red texture colors are summed by a summing circuit 190 to provide front interpolated opacity weighted red color $\tilde{C}_{RF}$.

Referring to FIG. 5, weighted opacities $\omega_0, \omega_1, \ldots \omega_7$ are multiplied by respective green texel values $C_{G0}, C_{G1}, \ldots C_{G7}$ in multipliers 194, 196, . . . 200, respectively, to provide opacity weighted green texture colors $\tilde{C}_{G0}, \tilde{C}_{G1}, \ldots \tilde{C}_{G7}$. The opacity weighted green texture colors are summed by a summing circuit 210 to provide front interpolated opacity weighted green color $\tilde{C}_{GF}$.

In a similar manner, weighted opacities $\omega_0, \omega_1, \ldots \omega_7$ are multiplied by respective blue texel values $C_{B0}, C_{B1}, \ldots C_{B7}$ in multipliers 214, 216, . . . 220, respectively, to provide opacity weighted blue texture colors $\tilde{C}_{B0}, \tilde{C}_{B1}, \ldots \tilde{C}_{B7}$. The opacity weighted blue texture colors are summed by a summing circuit 230 to provide front interpolated opacity weighted blue color $\tilde{C}_{BF}$.

Figure 6:
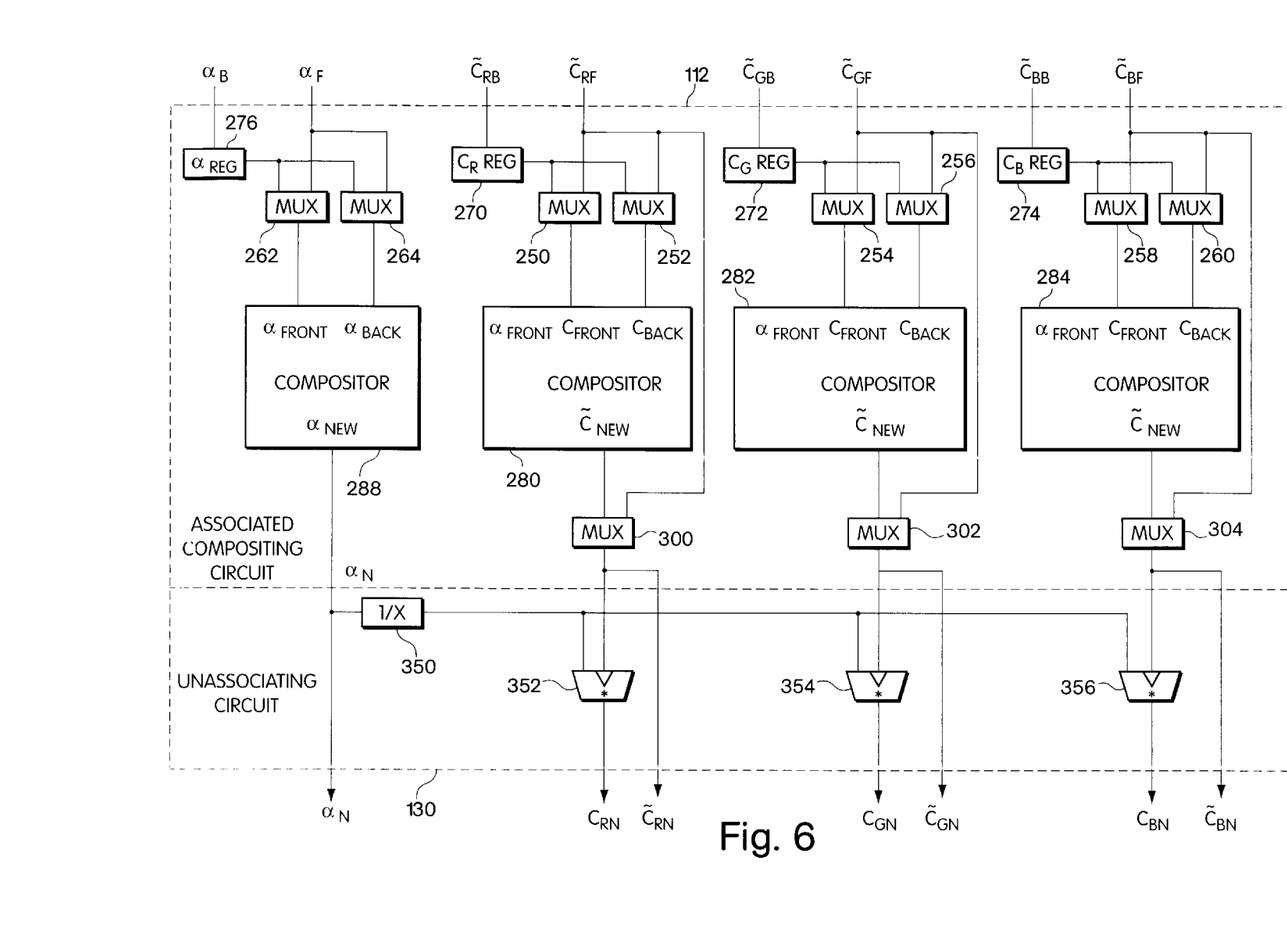
FIG. 6 is a block diagram of an embodiment of the associated compositing circuit and the unassociating circuit of FIG. 3.

A block diagram of associated compositing circuit 112 and unassociating circuit 130 is shown in FIG. 6. The associated compositing circuit 112 receives front color values $\tilde{C}_{RF}, \tilde{C}_{GF}, \ldots \tilde{C}_{BF}$ and front opacity value $\alpha_F$ from associating interpolator circuit 110 and receives back color values $\tilde{C}_{RB}, \tilde{C}_{GB}, \ldots \tilde{C}_{BB}$ and back opacity value $\alpha_B$ from frame buffer 120 through associating circuit 122 (see FIG. 3). The opacity weighted red color $\tilde{C}_{RF}$ is supplied to first inputs of multiplexers 250 and 252; opacity weighted green color $\tilde{C}_{GF}$ is supplied to first inputs of multiplexers 254 and 256; opacity weighted blue color $\tilde{C}_{BF}$ is supplied to first inputs of multiplexers 258 and 260; and interpolated opacity $\alpha_F$ is supplied to first inputs of multiplexers 262 and 264. The opacity weighted red color $\tilde{C}_{RB}$ is input to a color $C_R$ register 270; opacity weighted green color $\tilde{C}_{GB}$ is input to a color $C_G$ register 272; opacity weighted blue color $\tilde{C}_{BB}$ is input to a color $C_B$ register 274; and interpolated opacity $\alpha_B$ is input to an opacity $\alpha$ register 276. The contents of color register 270 are supplied to second inputs of multiplexers 250 and 252; the contents of color register 272 are supplied to second inputs of multiplexers 254 and 256; the contents of color register 274 are supplied to second inputs of multiplexers 258 and 260; and the contents of opacity register 276 are supplied to second inputs of multiplexers 262 and 264.

The outputs of multiplexers 250 and 252 are supplied to $C_{front}$ and $C_{back}$ inputs, respectively, of a compositor 280. The outputs of multiplexers 254 and 256 are supplied to $C_{front}$ and $C_{back}$ inputs of a compositor 282. The outputs of multiplexers 258 and 260 are supplied to $C_{front}$ and $C_{back}$ inputs, respectively, of a compositor 284. The outputs of multiplexers 262 and 264 are supplied to $\alpha_{front}$ and $\alpha_{back}$ inputs, respectively, of a compositor 288. The output of multiplexer 262 is also supplied to an $\alpha_{front}$ input of each of compositors 280, 282 and 284. The multiplexers at the inputs of compositors 280, 282, 284 and 288 permit the respective front and back color and opacity values to be swapped, depending on whether front-to-back compositing or back-to-front compositing is desired. The output of compositor 280 is supplied through a multiplexer 300 to unassociating circuit 130 as a new opacity weighted red color $\tilde{C}_{RN}$. The output of compositor 282 is supplied through a multiplexer 302 to unassociating circuit 130 as a new opacity weighted green color $\tilde{C}_{GN}$. The output of compositor 284 is supplied through a multiplexer 304 to unassociating circuit 130 as a new opacity weighted blue color $\tilde{C}_{BN}$. The multiplexers 300, 302 and 304 permit the associated compositing circuit 112 to be bypassed under control of the host computer. The output of compositor 288 is supplied to unassociating circuit 130 as a new opacity $\alpha_N$. Each of compositors 280, 282 and 284 may calculate the respective new opacity weighted color in accordance with $$\tilde{C}_{new}=(1-\alpha_{front})\tilde{C}_{back}+\tilde{C}_{front} \quad (1)$$

where $\tilde{C}_{new}$ represents a new associated color value, $\alpha_{front}$ represents a front opacity value, $\tilde{C}_{back}$ represents a back associated color value, and $\tilde{C}_{front}$ represents a front associated color value.

Opacity compositor 288 may calculate the new opacity $\alpha_N$ in accordance with $$\alpha_{new}=(1-\alpha_{front})\alpha_{back}+\alpha_{front} \quad (2)$$

where $\alpha_{new}$ represents a new opacity value, $\alpha_{front}$ represents a front opacity value, and $\alpha_{back}$ represents a back opacity value.

As shown in FIG. 6, unassociating circuit 130 includes a divider 350 and multipliers 352, 354 and 356. Divider 350 determines the reciprocal of new opacity $\alpha_N$ and supplies the reciprocal value to a first input of each of multipliers 352, 354 and 356. The new opacity weighted color $\tilde{C}_{RN}$ is supplied to a second input of multiplier 352. The new opacity weighted color $\tilde{C}_{GN}$ is supplied to a second input of multiplier 354. The new opacity weighted color $\tilde{C}_{BN}$ is supplied to a second input of multiplier 356. Thus, the new opacity weighted colors are divided by the new opacity to provide unassociated new colors $C_{RN}, C_{GN}$ and $C_{BN}$. The unassociated new colors $C_{RN}, C_{GN}$ and $C_{BN}$, and the new opacity $\alpha_N$ are stored in frame buffer 120 (FIG. 3).

Figure 7A:
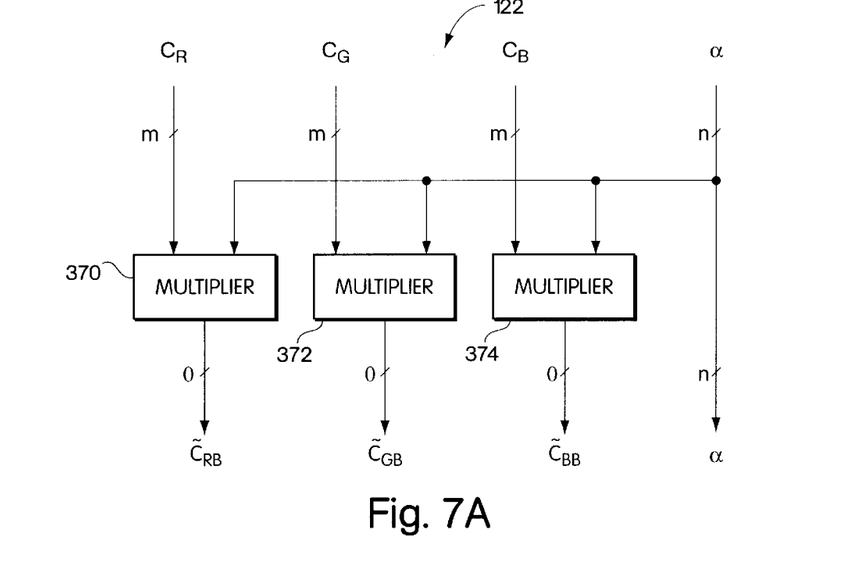
FIG. 7A is a block diagram of an embodiment of the associating circuit of FIG. 3.

A block diagram of associating circuit 122 (FIG. 3) is shown in FIG. 7A. The associating circuit 122 multiplies the unassociated color values stored in frame buffer 120, or output by unassociating circuit 130, by the corresponding opacity to provide associated colors for input to associated compositing circuit 112 as back opacity weighted color values and a back opacity. Referring to FIG. 7A, associating circuit 122 includes multipliers 370, 372 and 374. The unassociated colors $C_R, C_G$ and $C_B$, each having a word width of m bits, are supplied to first inputs of multipliers 370, 372 and 374, respectively. The corresponding opacity $\alpha_B$, having a word width of n bits, is supplied to the second input of each of multipliers 370, 372 and 374.

The outputs of multipliers 370, 372 and 374 are associated colors $\tilde{C}_{RB}, \tilde{C}_{GB}$ and $\tilde{C}_{BB}$, respectively, each having a word width of o bits. The associated colors may be stored in color registers 270, 272 and 274 (FIG. 6) of associated compositing circuit 112. The corresponding opacity may be stored in opacity register 276.

Since the color and opacity values are stored in frame buffer 120 in fixed point format, these values may be converted to fractional and higher precision values. For example, if all values in the frame buffer are eight bits each, then the fixed point opacity value may be divided by 255 to obtain a fractional opacity. The fractional opacity is then multiplied by the respective color values.

Figure 7B:
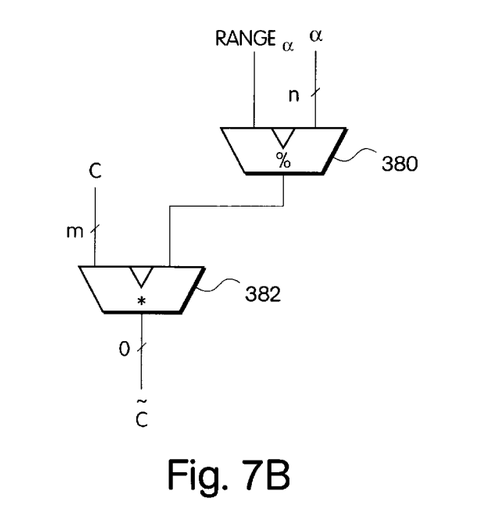
FIGS. 7B and 7C are block diagrams of first and second embodiments of the multipliers of FIG. 7A.

An implementation of each of multipliers 370, 372 and 374 is shown in FIG. 7B. A divider 380 divides the opacity $\alpha$ by the range of $\alpha$ (255 in the case of an eight bit value). The output of divider 380 and the color value from frame buffer 120 are supplied to a multiplier 382. The output of multiplier 382 represents the associated color value.

Figure 7C:
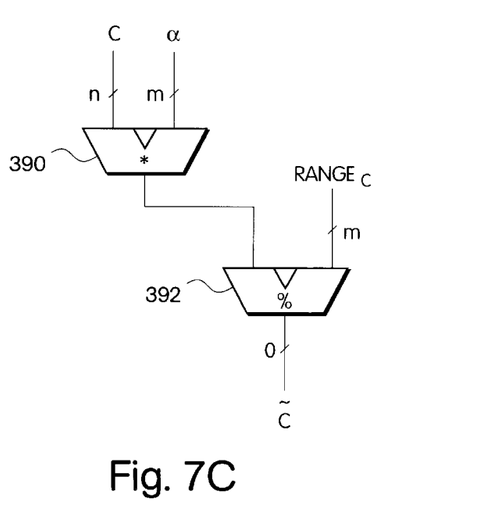

A second implementation of each of multipliers 370, 372 and 374 is shown in FIG. 7C. The color and opacity values are directly multiplied by a multiplier 390. The output of multiplier 390 is supplied to an input of a divider 392. The output of multiplier 390 is divided by the range of the color value to provide an associated color output. The associating circuit 122 can provide a floating point or fixed point output. It is assumed that the number of bits o in the associated colors is greater than the number of bits m in the unassociated colors.

The associating interpolator circuit 110 shown in FIGS. 4 and 5 and described above operates simultaneously on eight texel colors and opacities. Other word width circuits may be used to calculate an equivalent result. For example, a four color word width circuit can process eight texel colors and opacities and output interpolated opacity weighted colors in two clock cycles.

Figure 8:
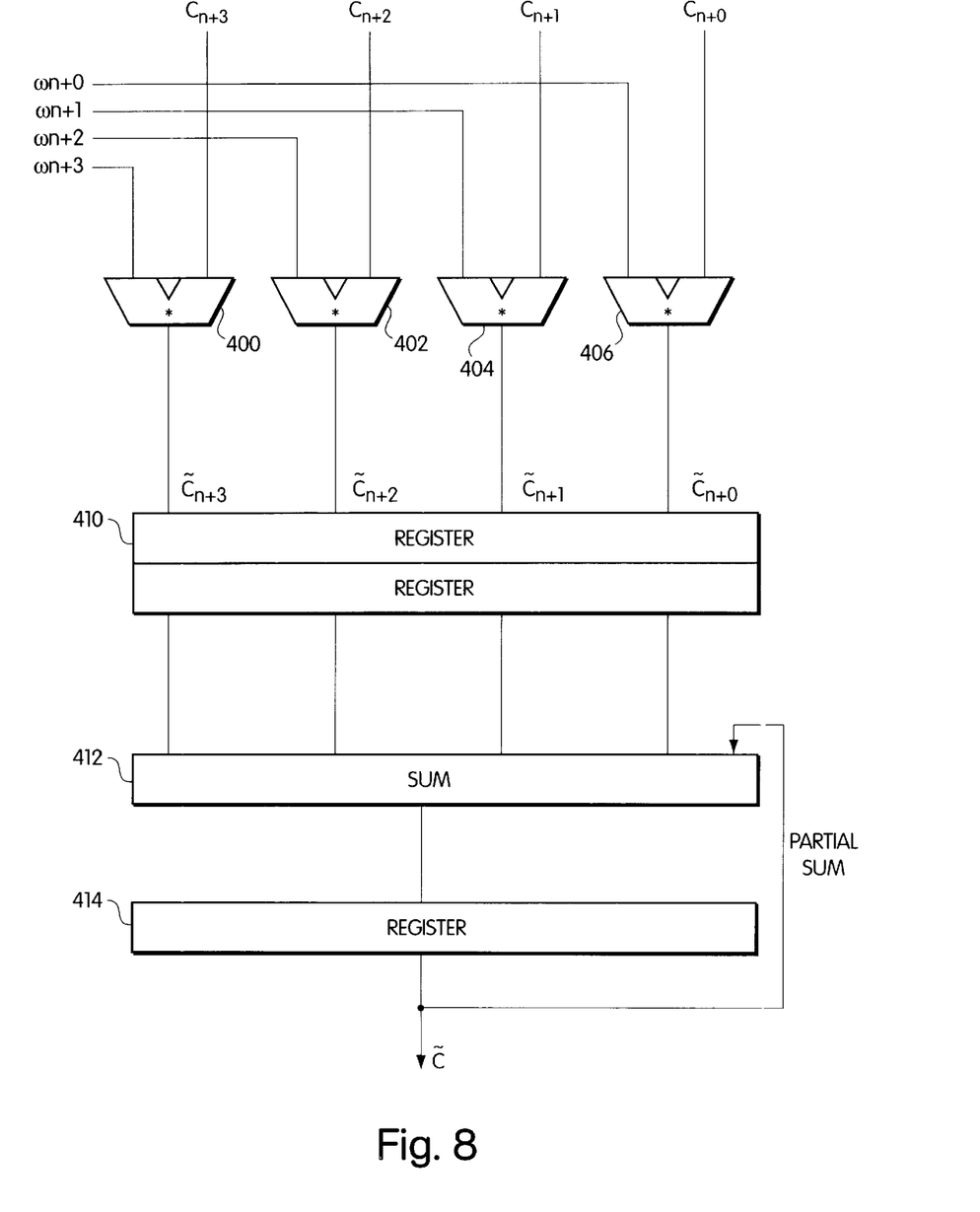
FIG. 8 is a block diagram of a second embodiment of the associating interpolator circuit of FIG. 3.

An example of a suitable associating interpolator circuit for operating on four color values at a time is shown in FIG. 8. Multipliers 400, 402 404 and 406 each receive a weighted opacity and a texture color to provide opacity weighted texture colors. The opacity weighted texture colors are stored in a two stage register 410. The outputs of register 410 are supplied to a summing circuit 412. The output of summing circuit 412 is stored in a register 414. The contents of register 414 are supplied to an input of summing circuit 412 as a partial sum in a second cycle.

One half of the eight texture colors and weighted opacities are input in each of two cycles. In cycle 1, texture color values $C_{R0}$, $C_{R1}$, $C_{R2}$, $C_{R3}$, $C_{G0}$, $C_{G1}$, $C_{G2}$, $C_{G3}$, $C_{B0}$, $C_{B1}$, $C_{B2}$ and $C_{B3}$, and opacities $\alpha_0$, $\alpha_1$, $\alpha_2$ and $\alpha_3$ are input. In cycle 2, texture color values $C_{R4}$, $C_{R5}$, $C_{R6}$, $C_{R7}$, $C_{G4}$, $C_{G5}$, $C_{G6}$, $C_{G7}$, $C_{B4}$, $C_{B5}$, $C_{B6}$ and $C_{B7}$, and opacities $\alpha_4$, $\alpha_5$, $\alpha_6$ and $\alpha_7$ are input. In the first cycle, a partial sum of the first four values is determined. In the second cycle, the partial sum is added to the result of the second cycle to provide a final sum.

A similar approach may be utilized to operate with two words input in four cycles or eight words input in eight cycles. In addition, it will be understood that the invention is not limited to interpolation of eight texture color values and opacities. The system may be modified to interpolate more than eight or fewer than eight texture colors and opacities, depending on the application.

The associated rasterizer shown and described herein operates on the same inputs as prior art rasterizers, but computes a higher quality result. This is achieved by calculating associated colors internally, which provides a more accurate interpolation. The result is unassociated before storage in the frame buffer.

While there have been shown and described what are at present considered the preferred embodiments of the present invention, it will be obvious to those skilled in the art that various changes and modifications may be made therein without departing from the scope of the invention as defined by the appended claims.

What is claimed is:

1. Texture mapping computer graphics apparatus comprising:
   an associating interpolator circuit for determining first interpolated opacity weighted colors and a first interpolated opacity in response to texture coordinates and a plurality of texture colors and corresponding texture opacities;
   an associated color compositing circuit for compositing the first interpolated opacity weighted colors and second interpolated opacity weighted colors to provide new opacity weighted colors;
   an associated opacity compositing circuit for compositing the first interpolated opacity and a second interpolated opacity to provide a new opacity;
   an unassociating circuit responsive to the new opacity weighted colors and the new opacity for providing unassociated new colors; and
   a frame buffer for storing the unassociated new colors and the new opacity.

2. Texture mapping computer graphics apparatus as defined in claim 1, wherein said associating interpolator circuit comprises a weight calculation circuit responsive to said texture coordinates for determining weights corresponding to each of said texture colors, and a plurality of multipliers for multiplying said texture opacities by corresponding ones of said weights to provide weighted opacities.

3. Texture mapping computer graphics apparatus as defined in claim 2, wherein said associating interpolator circuit further comprises an opacity summing circuit for summing said weighted opacities to provide said first interpolated opacity.

4. Texture mapping computer graphics apparatus as defined in claim 3, wherein said associating interpolator circuit further comprises, for each color component, a plurality of multipliers for multiplying said texture colors by corresponding ones of said weighted opacities to provide opacity weighted texture colors, and a color summing circuit for summing said opacity weighted texture colors to provide one of said first interpolated opacity weighted colors.

5. Texture mapping computer graphics apparatus as defined in claim 1, wherein said associated color compositing circuit comprises, for each color component, a color register for holding one of said second interpolated opacity weighted colors, first and second multiplexers for selecting interpolated opacity weighted colors from said associating interpolator circuit and said color register, and a compositor responsive to the selected interpolated opacity weighted colors and said interpolated opacity for determining said new opacity weighted color.

6. Texture mapping computer graphics apparatus as defined in claim 5, wherein each of said compositors calculates said new opacity weighted color in accordance with $$\tilde{C}_{new}=(1-\alpha_{front})\tilde{C}_{back}+\tilde{C}_{front}$$

where $\tilde{C}_{new}$ represents a new associated color value, $\alpha_{front}$ represents a front opacity value, $\tilde{C}_{back}$ represents a back associated color value, and $\tilde{C}_{front}$ represents a front associated color value.

7. Texture mapping computer graphics apparatus as defined in claim 1, wherein said associated opacity compositing circuit comprises an opacity register for holding said second interpolated opacity, first and second multiplexers for selecting interpolated opacities from said associating interpolator circuit and said opacity register, and a compositor responsive to the selected interpolated opacities for determining said new opacity.

8. Texture mapping computer graphics apparatus as defined in claim 7, wherein said compositor determines said new opacity in accordance with $$\alpha_{new}=(1-\alpha_{front})\alpha_{back}+\alpha_{front}$$

where $\alpha_{new}$ represents a new opacity value, $\alpha_{front}$ represents a front opacity value, and $\alpha_{back}$ represents a back opacity value.

9. Texture mapping computer graphics apparatus as defined in claim 1, wherein said unassociating circuit comprises a circuit for dividing each of said new opacity weighted colors by said interpolated opacity to provide said unassociated new colors.

10. Texture mapping computer graphics apparatus as defined in claim 1, wherein said new opacity weighted colors have higher precision than said unassociated new colors.

11. Texture mapping computer graphics apparatus as defined in claim 5, further comprising an associating circuit, responsive to unassociated colors accessed in said frame buffer, for providing one of said second opacity weighted colors to the color register for each color component.

12. A method for performing texture mapping in a computer graphics system, comprising the steps of:

determining first interpolated opacity weighted colors and a first interpolated opacity in response to texture coordinates and a plurality of texture colors and corresponding texture opacities;

compositing the first interpolated opacity weighted colors and second interpolated opacity weighted colors to provide new opacity weighted colors;

compositing the first interpolated opacity and a second interpolated opacity to provide a new opacity;

providing unassociated new colors in response to the new opacity weighted colors and the new opacity; and storing the unassociated new colors and the new opacity in a frame buffer.

13. A method as defined in claim 12, wherein the step of determining an interpolated opacity comprises determining weights corresponding to each of the texture colors in response to the texture coordinates, multiplying the texture opacities by corresponding ones of the weights to provide weighted opacities, and summing the weighted opacities to provide the first interpolated opacity.

14. A method as defined in claim 13, wherein the step of determining interpolated opacity weighted colors further comprises, for each color component, multiplying the texture colors by corresponding ones of said weighted opacities to provide opacity weighted texture colors, and summing said opacity weighted texture colors to provide one of said first interpolated opacity weighted colors.

15. A method as defined in claim 12, wherein the step of compositing the first and second interpolated opacity weighted colors comprises, for each color component, determining the new opacity weighted color in response to the first and second interpolated opacity weighted colors and the interpolated opacity.

16. A method as defined in claim 15, wherein the new opacity weighted color is calculated in accordance with $$\tilde{C}_{new} = (1 - \alpha_{front})\tilde{C}_{back} + \tilde{C}_{front}$$

where $\tilde{C}_{new}$ represents a new associated color value, $\alpha_{front}$ represents a front opacity value, $\tilde{C}_{back}$ represents a back associated color value, and $\tilde{C}_{front}$ represents a front associated color value.

17. A method as defined in claim 12, wherein the step of compositing the first and second interpolated opacities comprises determining the new opacity in response to the first and second interpolated opacities.

18. A method as defined in claim 17, wherein the new opacity is determined in accordance with $$\alpha_{new} = (1 - \alpha_{front})\alpha_{back} + \alpha_{front}$$

where $\alpha_{new}$ represents a new opacity value, $\alpha_{front}$ represents a front opacity value, and $\alpha_{back}$ represents a back opacity value.

19. A method as defined in claim 12, wherein the step of providing unassociated new colors comprises dividing each of the new opacity weighted colors by the interpolated opacity.

20. A method as defined in claim 12, wherein said new opacity weighted colors have higher precision than said unassociated new colors.

21. Texture mapping computer graphics apparatus comprising:

means for determining first interpolated opacity weighted colors and a first interpolated opacity in response to texture coordinates and a plurality of texture colors and corresponding texture opacities;

means for compositing the first interpolated opacity weighted colors and second interpolated opacity weighted colors to provide new opacity weighted colors;

means for compositing the first interpolated opacity and a second interpolated opacity to provide a new opacity;

means for providing unassociated new colors in response to the new opacity weighted colors and the new opacity; and means for storing the unassociated new colors and the new opacity.

* * * * *